US008645305B2

(12) United States Patent
Sandoval et al.

(10) Patent No.: US 8,645,305 B2
(45) Date of Patent: Feb. 4, 2014

(54) ASSIGNING SENSORS TO PATHS

(75) Inventors: Juan E. Sandoval, St. Petersburg, FL (US); Nicholas I. Sapankevych, Clearwater, FL (US); Sara R. Lemley, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 479 days.

(21) Appl. No.: 12/911,948

(22) Filed: Oct. 26, 2010

(65) Prior Publication Data

US 2012/0101969 A1 Apr. 26, 2012

(51) Int. Cl.
*G06F 17/00* (2006.01)
*G06N 5/02* (2006.01)
*G05B 19/18* (2006.01)
*G05B 15/00* (2006.01)
*G05B 19/00* (2006.01)

(52) U.S. Cl.
USPC ................ 706/50; 700/61; 700/253; 700/258

(58) Field of Classification Search
USPC ........................................... 700/61, 253, 258
See application file for complete search history.

(56) References Cited

U.S. PATENT DOCUMENTS 4,112,818 A 9/1978 Garehime, Jr.
5,047,916 A * 9/1991 Kondo ............................ 700/61
5,604,595 A 2/1997 Schoen
6,072,889 A * 6/2000 Deaett et al. .................. 382/103

OTHER PUBLICATIONS

Cardei, Mihaela, and Jie Wu. "Coverage in wireless sensor networks." Handbook of Sensor Networks (2004): 422-433.*
Streller, Daniel. "Road map assisted ground target tracking." Information Fusion, 2008 11th International Conference on. IEEE, 2008.*
Bereg, Sergey, and David Kirkpatrick. "Approximating barrier resilience in wireless sensor networks." Algorithmic Aspects of Wireless Sensor Networks (2009): 29-40.*
U.S. Appl. No. 61/379,916 entitled "Open Border Conops Analysis", inventors Juan E. Sandoval, et al., 30 pages, filed Sep. 3, 2010.

* cited by examiner

*Primary Examiner* — Jeffrey A Gaffin
*Assistant Examiner* — James F Sugent
(74) *Attorney, Agent, or Firm* — Schwegman, Lundberg & Woessner, P.A.

(57) ABSTRACT

According to certain embodiments, paths are identified from path data. One or more sensors are assigned to each path. The following are performed: at least one sensor is moved to a path intersection and excess sensors are removed. An excess sensor is a sensor that is not required to satisfy the desired number of sensors of one or more paths. According to certain embodiments, a combined array comprising combined entries is accessed. Each combined entry represents a location and has a value indicating a number of paths at the location. The following are performed to yield a sensor arrangement: a maximum value of the combined array is identified, a sensor is assigned to a location associated with the maximum value, and the paths are removed from the combined array. A result associated with the sensor arrangement is reported.

16 Claims, 6 Drawing Sheets

ASSIGNING SENSORS TO PATHS

TECHNICAL FIELD

This invention relates generally to the field of sensor devices and more specifically to assigning sensors to paths.

BACKGROUND

Sensors may be placed on paths in order to detect entities on the paths. As an example, a sensor may be placed at a border crossing to detect a human crossing a border. As another example, a sensor may be placed at a tollbooth to detect cars driving along a toll way. Path data describing paths of a region may be analyzed in order to determine locations where sensors may be placed.

SUMMARY OF THE DISCLOSURE

In accordance with the present invention, disadvantages and problems associated with previous techniques for assigning sensors to paths may be reduced or eliminated.

According to certain embodiments, paths are identified from path data. Each path is associated with a desired number of sensors and may be associated with a desired separation between sensors. One or more sensors are assigned to each path. The following are performed for one or more iterations to yield one or more sensor arrangements: at least one sensor is moved to a path intersection between two or more paths, and one or more excess sensors are removed. An excess sensor is a sensor that is not required to satisfy the desired number of sensors of one or more paths.

According to certain embodiments, a combined array comprising combined entries is accessed. Each combined entry represents a location and has a value indicating a number of paths at the location. The following are performed for one or more iterations to yield a sensor arrangement: a maximum value of the combined array is identified, a sensor is assigned to one or more paths associated with a location of the maximum value, and the one or more paths are removed from the combined array. Removing a path from an array may involve removing the values corresponding to the path from the array. A result associated with the sensor arrangement is reported.

Certain embodiments of the invention may provide one or more technical advantages. A technical advantage of one embodiment may be that sensors may be moved to intersections of paths, which may reduce the number of sensors used for the paths. Another technical advantage of one embodiment may be that an array may be used to identify locations with a maximum number of paths. Sensors may be assigned sensors to these locations, which may optimize sensor placement.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5C of the drawings, like numerals being used for like and corresponding parts of the various drawings.

Figure 1:
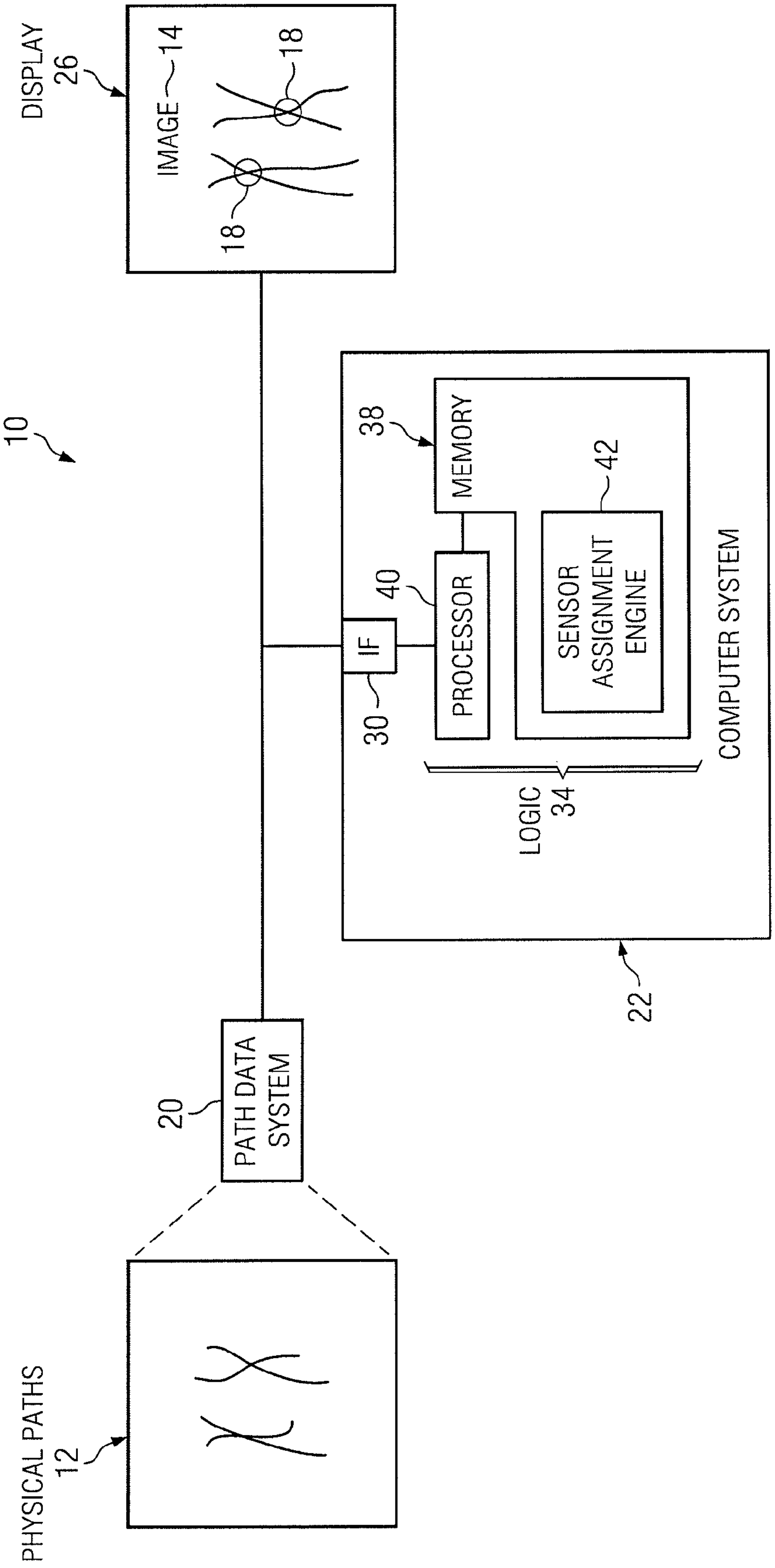
FIG. 1 illustrates an example of a system that may be used to determine path locations to which sensors may be assigned.

FIG. 1 illustrates an example of a system 10 that may be used to determine the locations on physical paths where sensors 18 may be assigned. In certain embodiments, system 10 may reduce or even optimize the number of sensors 18 used for physical paths 12.

In the illustrated example, system 10 includes a path data system 20, a computer system 22, and a display 26. Computer system 22 includes an interface 30, logic 34, and a memory 38. Logic 34 includes one or more processors 40 and a sensor assignment engine 42. Memory stores applications such as sensor assignment engine 42. In certain embodiments, path data system 20 obtains path data describing physical paths 12. Computer system 22 determines locations of paths 12 where sensors 18 may be placed. Display 26 displays an image 14 that indicates the location of sensors 18 along paths 12.

In certain embodiments, a physical path 12 may be a path located in the physical world. Physical path 12 may be located in, on, through, and/or along a solid, liquid, and/or gas. For example, a path 12 can run along the ground, through water, and/or through the air. Examples of paths 12 include walking paths, streets (for example, roads, city streets, and/or highways), water routes, and air paths. Physical entities may travel along some or all of a path 12. For example, a human may walk on or cross a walking path, and a car may drive on a street.

A sensor 18 may be used to detect entities along a path 16. A sensor 18 may detect light, sound, movement, radiation, and/or vibrations of an entity and/or of the path 12 itself. Examples of sensors 18 include photodetectors, vibration sensors, radiation detectors, and microphones.

In certain embodiments, a physical path 12 may be associated with a desired number of sensors 18 that designates the number of sensors 18 that a path 12 should have. A path 12 may be required to have any suitable number of sensors 18, for example, one, two, or more sensors 18. In certain embodiments, a first path may have a first desired number of sensors, and a second path may have a second number of sensors, where the first and second desired numbers of sensors may be the same or may be different.

Path data system 20 collects, accesses, processes, and/or provides path data that describes physical paths 12. Path data system 20 may obtain path data in any suitable manner. For example, path data system 20 may collect path data by detecting physical paths 12 and generating path data, or by accessing path data that has already been generated. Path data system 20 may process path data in any suitable manner. For example, path data system 20 may transform path data into a format that may be usable by computer system 22. Path data system 20 may provide the path data to computer system 22.

Path data represents physical paths 12 in data form. In certain examples, "path" may be used to refer to a physical path 12 or a path expressed in data form. Paths may be described in any suitable manner. In certain embodiments, a path 12 may be described using a coordinate system, such as a two-dimensional or three-dimensional coordinate system, that may represent a physical space, such as a two-dimensional or three-dimensional physical space. For example, a path along the ground, such as a street, may be described using a two-dimensional map. A path through the air may be described using a three-dimensional coordinate system. Path data may include any suitable data, for example, digital terrain elevation data (DTED) or geographic information system (GIS) data, and may be stored by memory 38.

Computer system 22 includes sensor assignment engine 42 that determines locations at which sensors 18 may be placed. Computer system 22 may represent sensors 18 in data form, for example, as a coordinate value of a coordinate system. In certain examples, "sensors" may be used to refer to a physical sensor 18 or a sensor expressed in data form.

The locations may be determined in any suitable manner. In certain embodiments, sensor assignment engine places sensors 18 at path intersections. In the embodiments, paths are identified from path data, where each path is associated with a desired number of sensors 18. One or more sensors 18 are assigned to each path. The following is performed for one or more iterations to yield one or more sensor arrangements: at least one sensor 18 is moved to a path intersection between two or more paths, and one or more excess sensors 18 are removed. An excess sensor 18 is a sensor 18 that is not required to satisfy the desired number of sensors 18 of one or more paths. A sensor arrangement describes locations of paths where sensors 18 may be placed.

In certain embodiments, sensor assignment engine 42 uses arrays to determine the path locations. In the embodiments, a combined array comprising combined entries is accessed. Each combined entry represents a location and has a value indicating a number of paths at the location. The following is performed for one or more iterations to yield a final combined array: a maximum value of the combined array is identified, a sensor is assigned to a location associated with the maximum value, and the paths are removed from the combined array. A path may be removed from an array by removing the values corresponding to the path from the array. A result associated with the assignment of sensors is reported.

Display device 26 may display an image 14 indicating the locations of sensors 18 on paths 12. Any suitable display device may be used, for example, a screen (such as a computer screen, a television screen, a helmet mounted screen), a monitor, and a printer.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Figure 2:
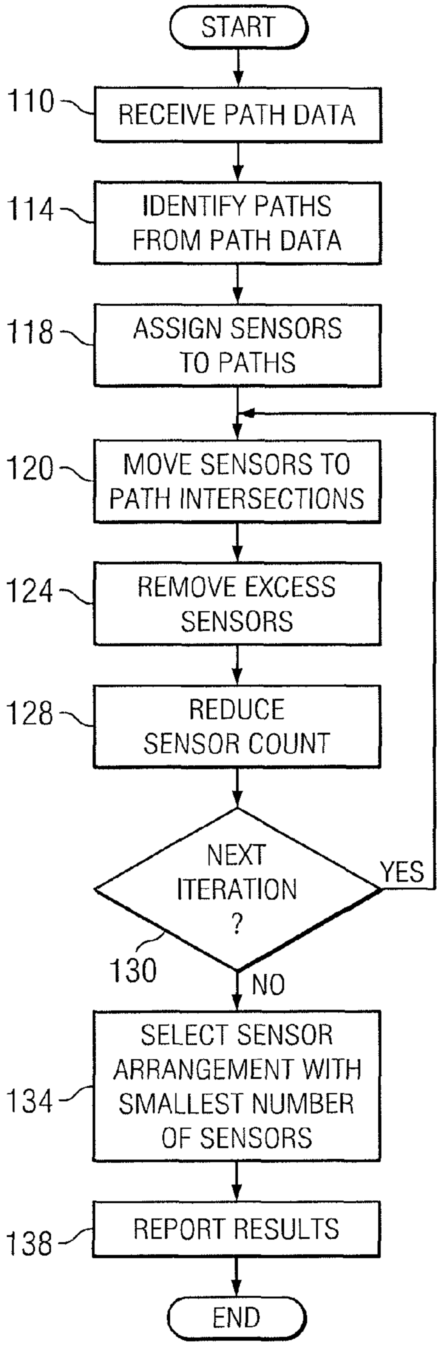
FIG. 2 illustrates an example of a method of determining path locations to which sensors may be assigned.

FIG. 2 illustrates an example of a method of determining path locations to which sensors may be assigned, and FIG. 3A through 3E illustrate an example of the method of FIG. 2.

The method starts at step 110, where path data is received. Path data may describe physical paths 12. In certain embodiments, computer system 22 may receive path data from path data system 20 thorough interface 30.

Figure 3A:
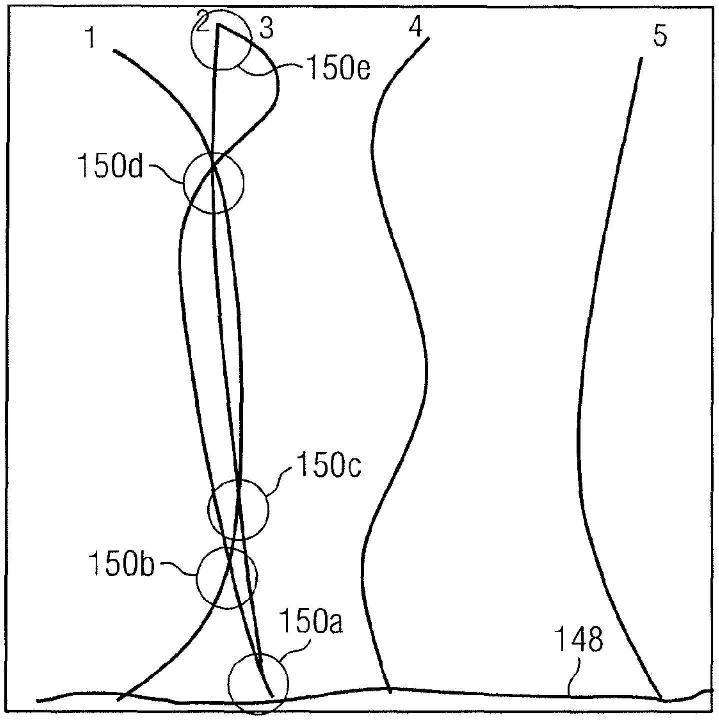
FIG. 3A through 3E illustrate an example of the method of FIG. 2.

Paths are identified from the path data at step 114. A path of the path data may represent a physical path 12. In the example of FIG. 3A, paths 1 through 5 are identified. In the example, paths 1 through 5 have an end that is close to a border 148. Border 148 may delineate any suitable space, for example, a region controlled by a government or other public organization (such as a state or country), an area owned by a company or other organization (such as a corporate headquarters), a private area controlled by a company or other organization (such as a military compound), and/or a structure (such as a building).

Two or more paths may intersect at a path intersection 150 (150*a-e*). A path intersection may be any suitable size. In certain embodiments, the size of a path intersection 150 may correspond to the area of detection that can be provided by a sensor 18. Accordingly, if a sensor 18 is located in intersection 150, sensor 18 can cover a path that is also located in intersection 150.

A path may be associated with a desired number of sensors that may be desired to be located on the path. In the example illustrated in FIG. 3A, the desired number of sensors 18 for each path is one sensor per path.

One or more sensors 18 are assigned to each path at step 118. Sensors 18 may be assigned to a path in any suitable manner. In certain embodiments, a path may be associated with a set of assigned sensors, or an assigned sensors set, that tracks sensors 18 assigned to the path. A sensor 18 may be assigned to the path by including the sensor 18 in the assigned sensors set of the path. In certain embodiments, a sensor count may track a total number of sensors that have been assigned to the paths. A sensor 18 may be assigned to any suitable portion of a path. For example, a sensor 18 may be assigned to an end or other portion of a path. Any suitable number of sensors may be assigned. For example, the desired number of sensors of a path may be assigned to the path.

Figure 3B:
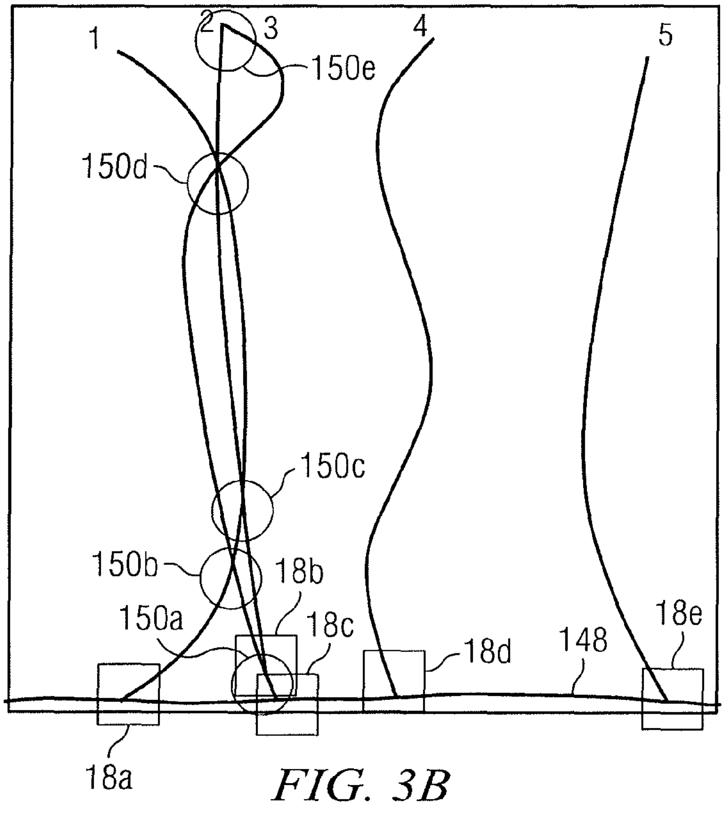

In the example of FIG. 3B, sensors 18*a-e* are assigned to paths 1 through 5, respectively. In the example, the desired number of sensors 18*a-e* (one sensor 18 per path) are assigned to the ends of the paths that are closest to border 148.

Figure 3C:
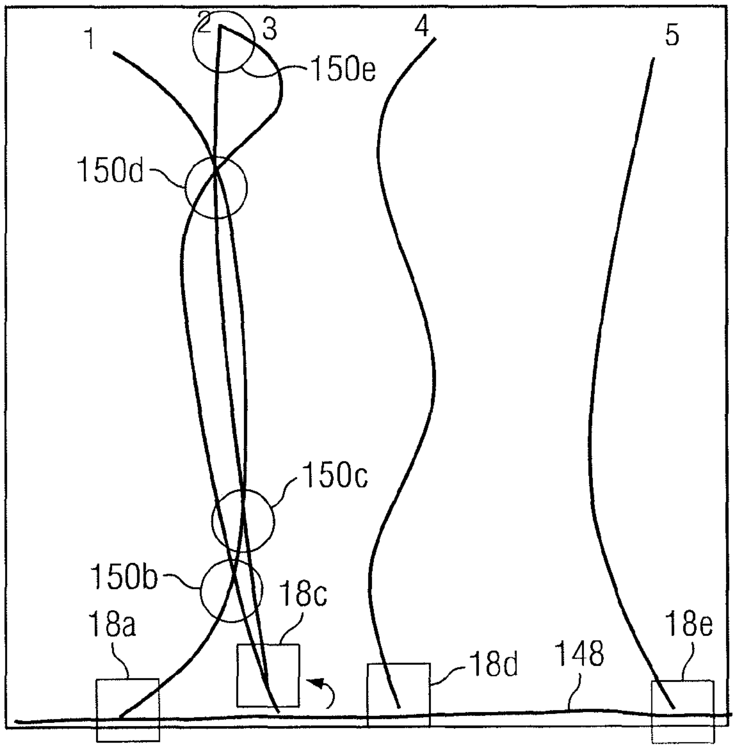

Steps 120 through 130 may be repeated for any suitable number of iterations, as described below with reference to step 130. At least one sensor 18 is moved to a path intersection 150 between two or more paths at step 120. A sensor 18 may be moved to an intersection 150 in any suitable manner. For example, if a sensor 18 is assigned to an end of a path, the sensor may be moved in a direction along the path away from the end until the sensor reaches an intersection 150. The sensor 18 continues to move in this direction during subsequent iterations. As a sensor 18 is moved to an intersection 150, the sensor becomes a member of assigned sensor sets of the paths of intersection 150. In the example of FIG. 3C, sensor 18*c* is moved to intersection 150*a*.

One or more excess sensors 18 are removed at step 124. An excess sensor 18 is a sensor 18 that is not required to satisfy the desired number of sensors 18 of the paths. An excess sensor 18 may be determined in any suitable manner. For example, if the assigned sensor set of a path includes more sensors 18 than the desired number of sensors 18, one or more sensors 18 may be excess sensors. A sensor 18 may be removed in any suitable manner. For example, a sensor 18 may be removed from a path by removing the sensor 18 from an assigned sensors set of the path.

In the example of FIG. 3C, sensors 18*b* and 18*c* provide coverage for paths 2 and 3. Since the desired number of sensors 18 for each path is one, one sensor 18*b* or 18*c* may be removed. In the illustrated example, sensor 18*b* is removed.

A sensor count may be reduced at step 128. A sensor count records the number of sensors that have been assigned and have not been removed. In certain embodiments, a sensor count may be reduced by n−1 when a sensor is moved to a path intersection, where represents the number of paths in the path intersection.

There may be a next iteration at step 130. In certain embodiments, iterations may be performed until a stop event occurs. A stop event may be designated as any suitable event. As an example, iterations may be performed until a predetermined maximum number of iterations has been reached. As another example, iterations may be performed until the sensor count reaches a desired minimum number of sensors.

Figure 3D:
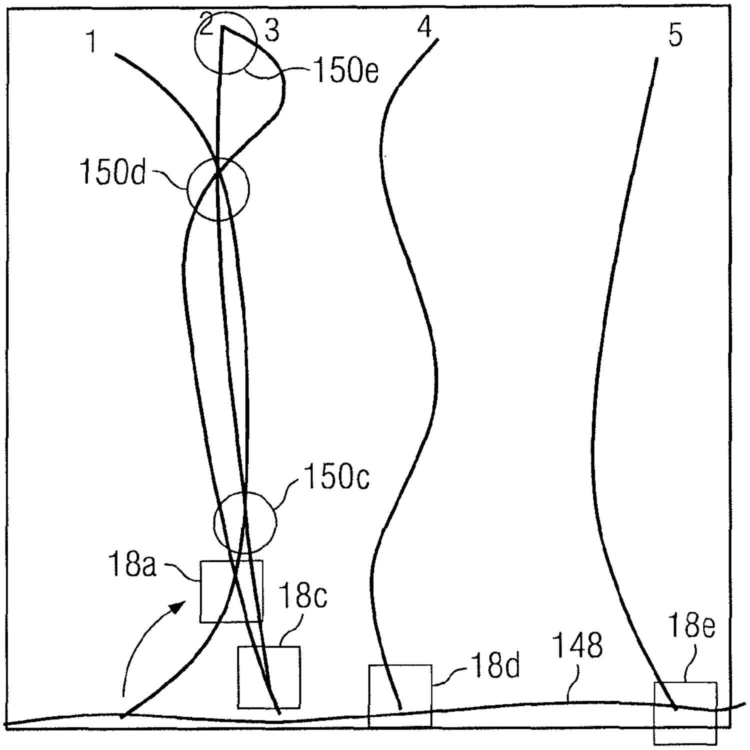
Figure 3E:
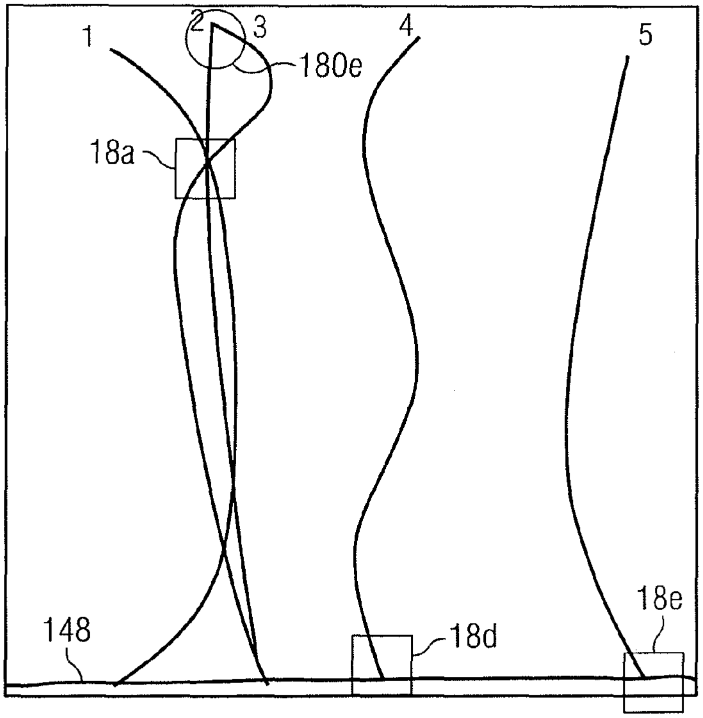

In the example of FIG. 3D, sensor 18*a* located at the end of path 1 is moved to intersection 150*b*. In the example of FIG. 3E, sensor 18*a* is moved to intersection 150*d*, and a sensor 18*c* is also moved to intersection 150*d*. Since the desired number of sensors for paths 1, 2, and 3 is one sensor, either sensor 18*a* or 18*c* may be removed. In the illustrated example, sensor 18*c* is removed.

The sensor arrangement with the smallest number of sensors is selected at step 134. In the illustrated example, a sensor arrangement with sensor 18*a* for paths 1, 2, and 3, sensor 18*d* for path 4, and sensor 18*e* for path 5 has a sensor count of three sensors, the smallest number of sensors.

Results are reported at step 138. The results may be reported in any suitable manner. As an example, results may be reported as a graph as shown in FIG. 3E. As another example, the results may be reported as a list of paths, where each path includes its assigned sensor set. In the example illustrated in FIG. 3E, paths 1, 2, and 3 may each have an assigned sensor set that includes sensor 18*a*, path 4 may have an assigned sensor set that includes sensor 18*d*, and path 5 may have an assigned sensor set that includes sensor 18*e*. As another example, the results may include a list of sensors 18 along with the paths to which they are assigned. In the example of FIG. 3E, the path list of sensor 18*a* may include paths 1, 2, and 3, the path list of sensor 18*d* may include path 4, and the path list of sensor 18*e* may include path 5.

Figure 4:
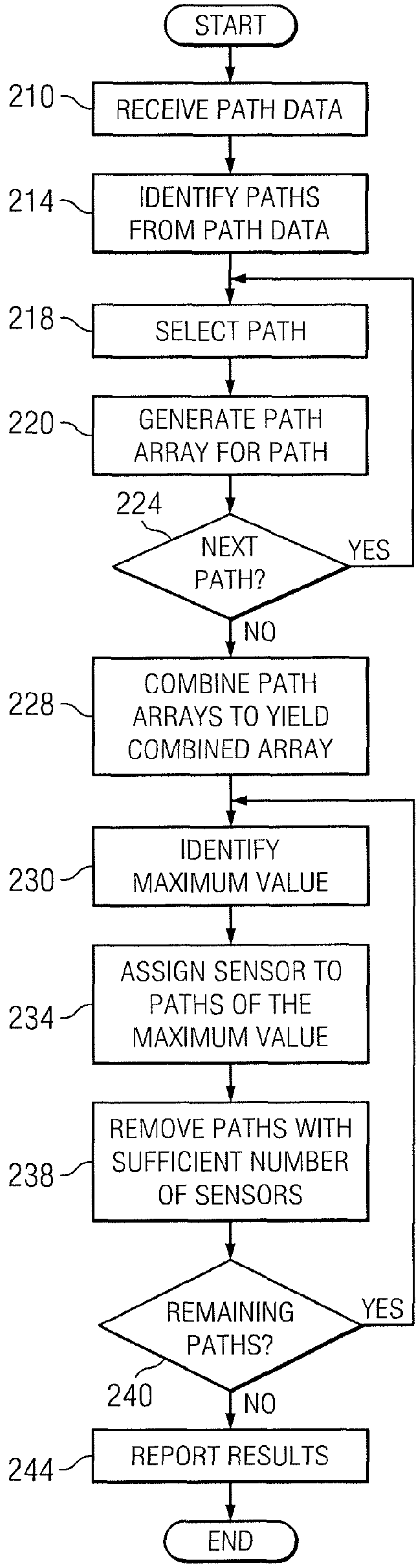
FIG. 4 illustrates another example of a method for determining path locations to which sensors may be assigned.
Figure 5A:
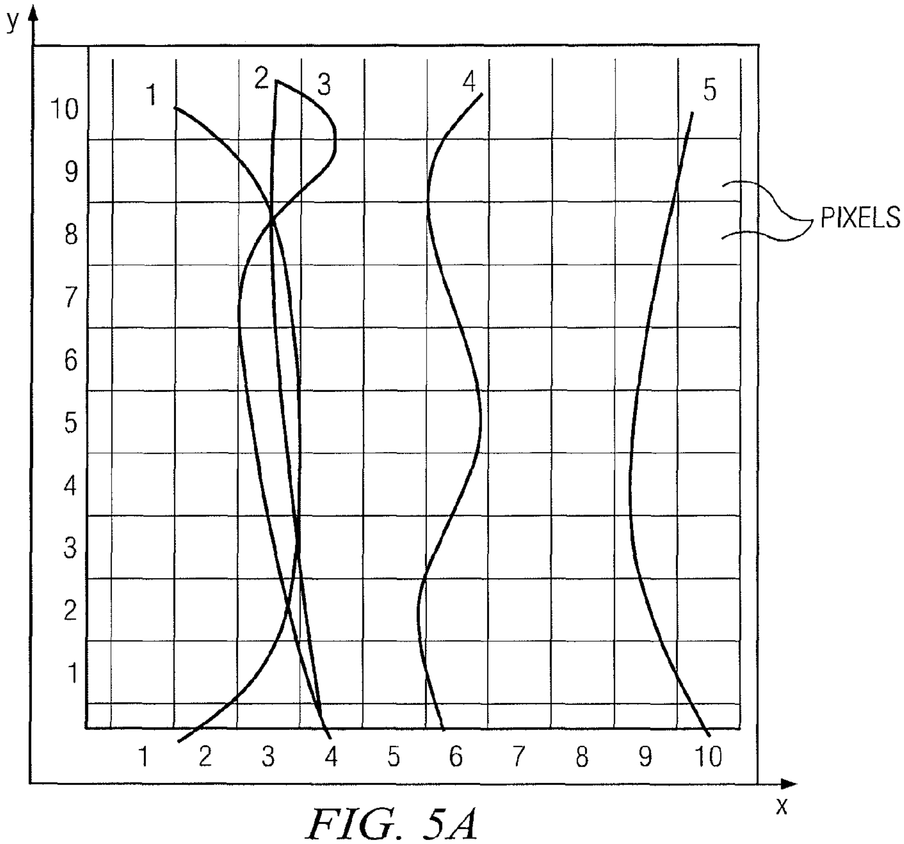
FIGS. 5A through 5C illustrate an example of the method of FIG. 4.
Figure 5B:
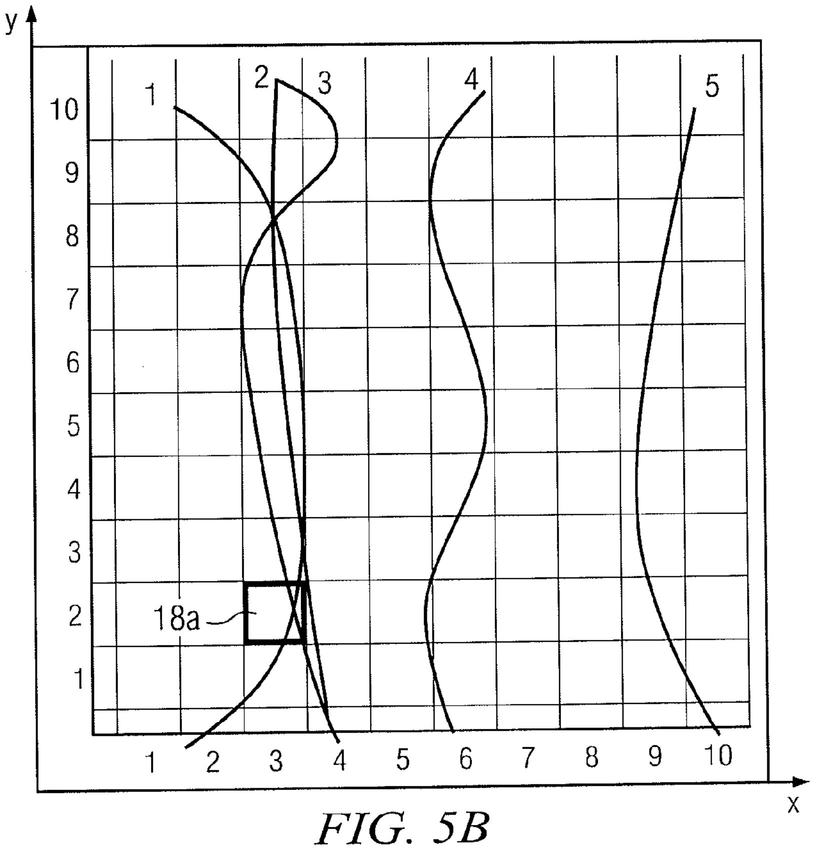
Figure 5C:
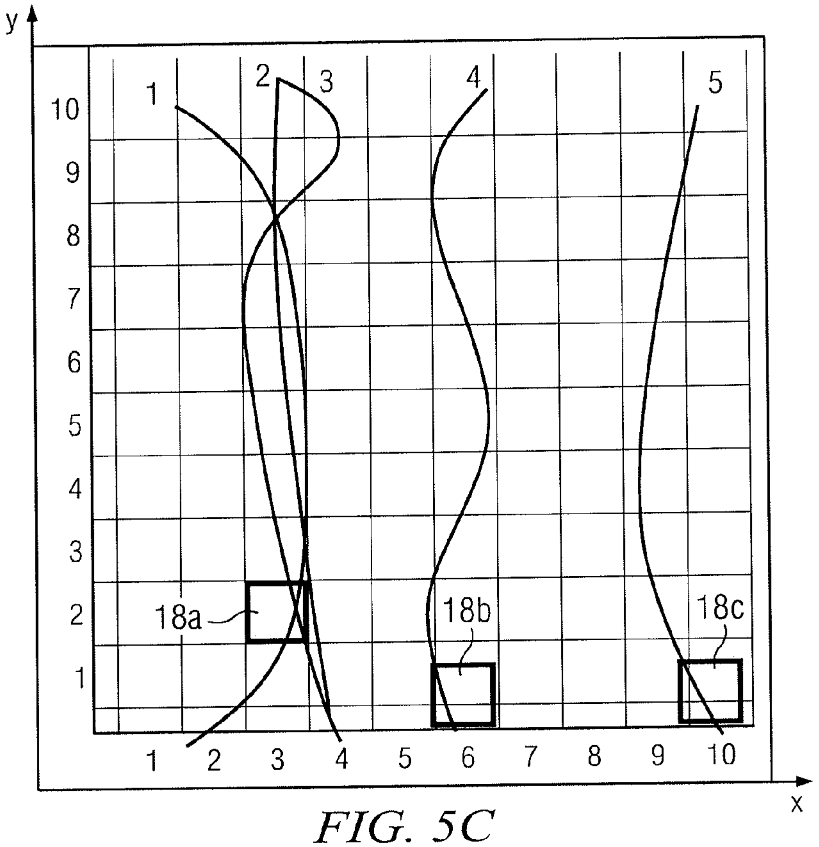

FIG. 4 illustrates another example of a method for determining path locations to which sensors may be assigned. FIGS. 5A through 5C illustrate an example of the method of FIG. 4.

The method starts at step 210, where path data is received. Paths are identified from the path data at step 214. The location of a path may be represented by pixels of a coordinate system. In the example of FIG. 5A, a two-dimensional coordinate system is illustrated. A coordinate system may be divided into pixels, where each pixel has a coordinate of a coordinate system. In the example of FIG. 5A, the two-dimensional coordinate system has pixels from 1 to 10 in the x-direction and 1 to 10 in the y-direction. In certain embodiments, the size of a pixel may correspond to the area of detection that can be provided by a sensor 18. If a sensor 18 is located in a pixel, sensor 18 can cover a path that is also located in the pixel.

Steps 218 through 228 describe generating a combined array, with steps 218 through 224 describing generating path arrays used to generate the combined array. An array may represent a coordinate system, and may be stored by memory 38. As an example, a two-dimensional array may represent a two-dimensional coordinate system, and a three-dimensional array may represent a three-dimensional coordinate system. Each entry of an array may correspond to a pixel of a coordinate system. An entry of an array may have a value that indicates the number of paths located in the pixel corresponding to the entry.

Examples of arrays include a path array and a combined array. A path array comprises a path entries. Each path entry of a path array represents a location and has a value indicating whether the path of the path array is at the location. A combined array comprises combined entries. Each combined entry represents a location. Each combined entry has a value indicating the number of paths at the location.

A path is selected at step 218. A path array is generated for the path at step 220. In the example illustrated in FIG. 5A, ARRAY 1 is generated for path 1.

ARRAY 1: Path 1 Array

| | | | | | | | | | | |
|---|---|---|---|---|---|---|---|---|---|---|
| 10 | 0 | 1 | 0 | 0 | 0 | 0 | 0 | 0 | 0 | 0 |
| 9 | 0 | 0 | 1 | 0 | 0 | 0 | 0 | 0 | 0 | 0 |
| 8 | 0 | 0 | 1 | 0 | 0 | 0 | 0 | 0 | 0 | 0 |
| 7 | 0 | 0 | 1 | 0 | 0 | 0 | 0 | 0 | 0 | 0 |
| 6 | 0 | 0 | 1 | 0 | 0 | 0 | 0 | 0 | 0 | 0 |
| 5 | 0 | 0 | 1 | 0 | 0 | 0 | 0 | 0 | 0 | 0 |
| 4 | 0 | 0 | 1 | 0 | 0 | 0 | 0 | 0 | 0 | 0 |
| 3 | 0 | 0 | 1 | 0 | 0 | 0 | 0 | 0 | 0 | 0 |
| 2 | 0 | 0 | 1 | 0 | 0 | 0 | 0 | 0 | 0 | 0 |
| 1 | 0 | 1 | 0 | 0 | 0 | 0 | 0 | 0 | 0 | 0 |
| 0 | 1 | 2 | 3 | 4 | 5 | 6 | 7 | 8 | 9 | 10 |

In the example, entry (i,j) is the entry at column i and row j. Entry (i,j) represents pixel (x,y), where i=x and j=y. In the example, the value of entry (i,j) indicates whether path 1 is located at pixel (x,y).

There may be a next path at step 224. If there is a next path at step 224, the method returns to step 218 to select the next path. If there is no next path, the method proceeds to step 228.

In the example, arrays 2 through 5 may be generated for paths 2 through 5, respectively.

ARRAY 2: Path 2 Array

| | | | | | | | | | | |
|---|---|---|---|---|---|---|---|---|---|---|
| 10 | 0 | 0 | 1 | 0 | 0 | 0 | 0 | 0 | 0 | 0 |
| 9 | 0 | 0 | 1 | 0 | 0 | 0 | 0 | 0 | 0 | 0 |
| 8 | 0 | 0 | 1 | 0 | 0 | 0 | 0 | 0 | 0 | 0 |
| 7 | 0 | 0 | 1 | 0 | 0 | 0 | 0 | 0 | 0 | 0 |
| 6 | 0 | 0 | 1 | 0 | 0 | 0 | 0 | 0 | 0 | 0 |
| 5 | 0 | 0 | 1 | 0 | 0 | 0 | 0 | 0 | 0 | 0 |
| 4 | 0 | 0 | 1 | 0 | 0 | 0 | 0 | 0 | 0 | 0 |
| 3 | 0 | 0 | 1 | 0 | 0 | 0 | 0 | 0 | 0 | 0 |
| 2 | 0 | 0 | 1 | 0 | 0 | 0 | 0 | 0 | 0 | 0 |
| 1 | 0 | 0 | 0 | 1 | 0 | 0 | 0 | 0 | 0 | 0 |
| 0 | 1 | 2 | 3 | 4 | 5 | 6 | 7 | 8 | 9 | 10 |

ARRAY 3: Path 3 Array

| | | | | | | | | | | |
|---|---|---|---|---|---|---|---|---|---|---|
| 10 | 0 | 0 | 0 | 1 | 0 | 0 | 0 | 0 | 0 | 0 |
| 9 | 0 | 0 | 0 | 1 | 0 | 0 | 0 | 0 | 0 | 0 |
| 8 | 0 | 0 | 1 | 0 | 0 | 0 | 0 | 0 | 0 | 0 |
| 7 | 0 | 0 | 1 | 0 | 0 | 0 | 0 | 0 | 0 | 0 |
| 6 | 0 | 0 | 1 | 0 | 0 | 0 | 0 | 0 | 0 | 0 |
| 5 | 0 | 0 | 1 | 0 | 0 | 0 | 0 | 0 | 0 | 0 |
| 4 | 0 | 0 | 1 | 0 | 0 | 0 | 0 | 0 | 0 | 0 |
| 3 | 0 | 0 | 1 | 0 | 0 | 0 | 0 | 0 | 0 | 0 |
| 2 | 0 | 0 | 1 | 0 | 0 | 0 | 0 | 0 | 0 | 0 |
| 1 | 0 | 0 | 0 | 1 | 0 | 0 | 0 | 0 | 0 | 0 |
| 0 | 1 | 2 | 3 | 4 | 5 | 6 | 7 | 8 | 9 | 10 |

ARRAY 4: Path 4 Array

| | | | | | | | | | | |
|---|---|---|---|---|---|---|---|---|---|---|
| 10 | 0 | 0 | 0 | 0 | 0 | 1 | 0 | 0 | 0 | 0 |
| 9 | 0 | 0 | 0 | 0 | 0 | 1 | 0 | 0 | 0 | 0 |
| 8 | 0 | 0 | 0 | 0 | 0 | 1 | 0 | 0 | 0 | 0 |
| 7 | 0 | 0 | 0 | 0 | 0 | 1 | 0 | 0 | 0 | 0 |
| 6 | 0 | 0 | 0 | 0 | 0 | 1 | 0 | 0 | 0 | 0 |
| 5 | 0 | 0 | 0 | 0 | 0 | 1 | 0 | 0 | 0 | 0 |
| 4 | 0 | 0 | 0 | 0 | 0 | 1 | 0 | 0 | 0 | 0 |
| 3 | 0 | 0 | 0 | 0 | 0 | 1 | 0 | 0 | 0 | 0 |
| 2 | 0 | 0 | 0 | 0 | 1 | 0 | 0 | 0 | 0 | 0 |
| 1 | 0 | 0 | 0 | 0 | 0 | 1 | 0 | 0 | 0 | 0 |
| 0 | 1 | 2 | 3 | 4 | 5 | 6 | 7 | 8 | 9 | 10 |

ARRAY 5: Path 5 Array

| | | | | | | | | | | |
|---|---|---|---|---|---|---|---|---|---|---|
| 10 | 0 | 0 | 0 | 0 | 0 | 0 | 0 | 0 | 0 | 1 |
| 9 | 0 | 0 | 0 | 0 | 0 | 0 | 0 | 0 | 0 | 1 |
| 8 | 0 | 0 | 0 | 0 | 0 | 0 | 0 | 0 | 1 | 0 |
| 7 | 0 | 0 | 0 | 0 | 0 | 0 | 0 | 0 | 1 | 0 |
| 6 | 0 | 0 | 0 | 0 | 0 | 0 | 0 | 0 | 1 | 0 |
| 5 | 0 | 0 | 0 | 0 | 0 | 0 | 0 | 0 | 1 | 0 |
| 4 | 0 | 0 | 0 | 0 | 0 | 0 | 0 | 0 | 1 | 0 |
| 3 | 0 | 0 | 0 | 0 | 0 | 0 | 0 | 0 | 1 | 0 |
| 2 | 0 | 0 | 0 | 0 | 0 | 0 | 0 | 0 | 1 | 0 |
| 1 | 0 | 0 | 0 | 0 | 0 | 0 | 0 | 0 | 0 | 1 |
| 0 | 1 | 2 | 3 | 4 | 5 | 6 | 7 | 8 | 9 | 10 |

The path arrays are combined at step 228 to yield a combined array. In certain embodiments, the path arrays may be combined by applying a mathematical function to the path arrays to yield the combined array. The arrays may be combined by adding values of the corresponding path entries to yield the combined entries. For example, the value of entry (i,j) of one array may be added to the value of entry (i,j) of another array to yield the combined value. In the example, path 1 through 4 arrays are combined to yield the combined array:

ARRAY 6: Combined Array

| | | | | | | | | | | |
|---|---|---|---|---|---|---|---|---|---|---|
| 10 | 0 | 1 | 1 | 1 | 0 | 1 | 0 | 0 | 0 | 1 |
| 9 | 0 | 0 | 2 | 1 | 0 | 1 | 0 | 0 | 0 | 1 |
| 8 | 0 | 0 | 3 | 0 | 0 | 1 | 0 | 0 | 1 | 0 |
| 7 | 0 | 0 | 3 | 0 | 0 | 1 | 0 | 0 | 1 | 0 |
| 6 | 0 | 0 | 3 | 0 | 0 | 1 | 0 | 0 | 1 | 0 |
| 5 | 0 | 0 | 3 | 0 | 0 | 1 | 0 | 0 | 1 | 0 |
| 4 | 0 | 0 | 3 | 0 | 0 | 1 | 0 | 0 | 1 | 0 |
| 3 | 0 | 0 | 3 | 0 | 0 | 1 | 0 | 0 | 1 | 0 |
| 2 | 0 | 0 | 3 | 0 | 1 | 0 | 0 | 0 | 1 | 0 |
| 1 | 0 | 1 | 0 | 2 | 0 | 1 | 0 | 0 | 0 | 1 |
| 0 | 1 | 2 | 3 | 4 | 5 | 6 | 7 | 8 | 9 | 10 |

Steps 230 through 240 may be performed for one or more iterations to yield a final combined array. A maximum value of the combined array is identified at step 230. A sensor is assigned to one or more paths associated with the maximum value at step 234. A path associated with a maximum value if the path is in a pixel that corresponds to the entry in which the maximum value is located.

If more than one entry has the maximum value, any suitable manner may be used to select the entry corresponding to the pixel where the sensor is to be placed. For example, the entry with the lowest (or highest) i value and/or j value may be selected. In certain embodiments, entries corresponding to locations that are closest to a border may be selected first. In the example, an entry with the lowest i value, then the lowest j value is selected. In the example, three is the maximum value, and entry (2,3) is selected. In the example of FIG. 5B, sensor 18*a* is assigned to pixel (2,3).

Paths with their desired number of sensors are removed from the combined array at step 238. For example, if the desired number of sensors for a path is one sensor, the path may be removed once a sensor has been assigned to the path. Paths may be removed in any suitable manner. In certain embodiments, the values corresponding to the locations of the paths may be set to indicate no paths at the locations, for example, the values may be set to zero. The values may be set to zero in any suitable manner. For example, the arrays of the paths to be removed may be subtracted from the combined array. That is, the values of entries (i,j) of the path arrays may be subtracted from the values of entry (i,j) of the combined array.

In the example, removing paths 1, 2, and 3 from the combined array yields ARRAY 7:

ARRAY 7: Combined Array 2

| | | | | | | | | | | |
|---|---|---|---|---|---|---|---|---|---|---|
| 10 | 0 | 0 | 0 | 0 | 0 | 1 | 0 | 0 | 0 | 1 |
| 9 | 0 | 0 | 0 | 0 | 0 | 1 | 0 | 0 | 0 | 1 |
| 8 | 0 | 0 | 0 | 0 | 0 | 1 | 0 | 0 | 1 | 0 |
| 7 | 0 | 0 | 0 | 0 | 0 | 1 | 0 | 0 | 1 | 0 |
| 6 | 0 | 0 | 0 | 0 | 0 | 1 | 0 | 0 | 1 | 0 |
| 5 | 0 | 0 | 0 | 0 | 0 | 1 | 0 | 0 | 1 | 0 |
| 4 | 0 | 0 | 0 | 0 | 0 | 1 | 0 | 0 | 1 | 0 |
| 3 | 0 | 0 | 0 | 0 | 0 | 1 | 0 | 0 | 1 | 0 |
| 2 | 0 | 0 | 0 | 0 | 1 | 0 | 0 | 0 | 1 | 0 |
| 1 | 0 | 0 | 0 | 0 | 0 | 1 | 0 | 0 | 0 | 1 |
| 0 | 1 | 2 | 3 | 4 | 5 | 6 | 7 | 8 | 9 | 10 |

There may be remaining paths in the combined array at step 240. In certain embodiments, there may be remaining paths if the combined array includes non-zero values. If there are remaining paths, the method returns to step 230 to identify the maximum value of the combined array. If there are no remaining paths the method proceeds to step 244.

In the example, paths 4 and 5 remain in the combined array. The maximum value is one, and entry (1,6) is selected. In the example of FIG. 5C, sensor 18*b* is placed at pixel (1,6). Path 4 may be removed from the combined array to yield ARRAY 8:

ARRAY 8: Combined Array 3

| | | | | | | | | | | |
|---|---|---|---|---|---|---|---|---|---|---|
| 10 | 0 | 0 | 0 | 0 | 0 | 0 | 0 | 0 | 0 | 1 |
| 9 | 0 | 0 | 0 | 0 | 0 | 0 | 0 | 0 | 0 | 1 |
| 8 | 0 | 0 | 0 | 0 | 0 | 0 | 0 | 0 | 1 | 0 |
| 7 | 0 | 0 | 0 | 0 | 0 | 0 | 0 | 0 | 1 | 0 |
| 6 | 0 | 0 | 0 | 0 | 0 | 0 | 0 | 0 | 1 | 0 |
| 5 | 0 | 0 | 0 | 0 | 0 | 0 | 0 | 0 | 1 | 0 |
| 4 | 0 | 0 | 0 | 0 | 0 | 0 | 0 | 0 | 1 | 0 |
| 3 | 0 | 0 | 0 | 0 | 0 | 0 | 0 | 0 | 1 | 0 |
| 2 | 0 | 0 | 0 | 0 | 0 | 0 | 0 | 0 | 1 | 0 |
| 1 | 0 | 0 | 0 | 0 | 0 | 0 | 0 | 0 | 0 | 1 |
| 0 | 1 | 2 | 3 | 4 | 5 | 6 | 7 | 8 | 9 | 10 |

The maximum value is one, and entry (1,10) is selected. In the example of FIG. 5C, sensor 18*c* is placed at pixel (1,10). Path 5 is then removed from the combined array to yield ARRAY 9:

ARRAY 9: Combined Array 4

| | | | | | | | | | | |
|---|---|---|---|---|---|---|---|---|---|---|
| 10 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 0 | 1 | 2 | 3 | 4 | 5 | 6 | 7 | 8 | 9 | 10 |

ARRAY 8 includes only zeros indicating that there are no remaining paths.

A result associated with the final combined array is reported at step 244. Any suitable result may be reported. In certain embodiments, a graphic showing the assigned sensors may be generated from the assigned sensors and display of the graphic may be initiated.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of sensor assignment engine 42 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:

receiving path data for a plurality of paths;

identifying the plurality of paths from received path data, each path associated with a desired number of sensors, wherein each of the plurality of paths is a physical path followed by physical entities;

assigning one or more sensors to each path; and performing the following for one or more iterations to yield one or more sensor arrangements:

moving at least one sensor to a path intersection between two or more paths;

removing one or more excess sensors, an excess sensor being a sensor that is not required to satisfy the desired number of sensors of one or more paths; and reducing a sensor count when a sensor is moved to a path intersection by n−1, where n represents the number of paths in the path intersection.

2. The method of claim 1, further comprising:

selecting the sensor arrangement with the smallest number of sensors.

3. The method of claim 1, the assigning one or more sensors to each path further comprising:

assigning the desired number of sensors of a path to the path.

4. The method of claim 1, the performing the following for one or more iterations further comprising performing until a stop event occurs, the stop event comprising:

a maximum number of iterations has been reached; or a desired minimum number of sensors has been reached.

5. An apparatus comprising:

a memory configured to store path data; and one or more processers configured to:

receiving path data for a plurality of paths;

identifying the plurality of paths from the received path data, each path associated with a desired number of sensors, wherein each of the plurality of paths is a physical path followed by physical entities;

assigning one or more sensors to each path; and performing the following for one or more iterations to yield one or more sensor arrangements:

moving at least one sensor to a path intersection between two or more paths; and removing one or more excess sensors, an excess sensor being a sensor that is not required to satisfy the desired number of sensors of one or more paths; and reducing a sensor count when a sensor is moved to a path intersection by n−1, where n represents the number of paths in the path intersection.

6. The apparatus of claim 5 the one or more processers further configured to:

select the sensor arrangement with the smallest number of sensors.

7. The apparatus of claim 5, the assigning one or more sensors to each path further comprising:

assigning the desired number of sensors of a path to the path.

8. The apparatus of claim 5, the performing the following for one or more iterations further comprising performing until a stop event occurs, the stop event comprising:

a maximum number of iterations has been reached; or a desired minimum number of sensors has been reached.

9. A method comprising:

receiving path data for a plurality of paths;

generating a path array for each path to yield a plurality of path arrays, each path array comprising a plurality of path entries, each path entry of a path array representing a location and having a value indicating whether the path of the path array is at the location;

summing the plurality of path arrays to yield a combined array;

accessing the combined array comprising a plurality of combined entries, each combined entry representing a location and having a value indicating a number of paths at the location, wherein each of the number of paths is a physical path followed by physical entities;

performing the following for one or more iterations to yield a sensor arrangement:

identifying a maximum value of the combined array;

assigning a sensor to a location associated with the maximum value; and removing the one or more paths from the combined array; and reporting a result associated with the sensor arrangement.

10. The method of claim 9, the removing the one or more paths from the combined array further comprising:

setting the values corresponding to the locations of the one or more paths to indicate zero paths at the locations.

11. The method of claim 9, the performing the following for one or more iterations further comprising performing until no more paths remain in the combined array.

12. The method of claim 9, the reporting the result associated with the sensor arrangement further comprising:

generating a graphic indicating the sensor arrangement; and initiating display of the graphic.

13. An apparatus comprising:

a memory configured to store a combined array comprising a plurality of combined entries, each combined entry representing a location and having a value indicating a number of paths at the location, wherein each of the number of paths is a physical path followed by physical entities;

one or more processors configured to:

generate the combined array by:

generating a path array for each path to yield a plurality of path arrays, each path array comprising a plurality of path entries, each path entry of a path array representing a location and having a value indicating whether the path of the path array is at the location;

summing the plurality of path arrays to yield the combined array;

perform the following for one or more iterations to yield a sensor arrangement:

identify a maximum value of the combined array;

assign a sensor to a location associated with the maximum value; and remove the one or more paths from the combined array; and report a result associated with the sensor arrangement.

14. The apparatus of claim 13, the removing the one or more paths from the combined array further comprising:

setting the values corresponding to the locations of the one or more paths to indicate zero paths at the locations.

15. The apparatus of claim 13, the performing the following for one or more iterations further comprising performing until no more paths remain in the combined array.

16. The apparatus of claim 13, the reporting the result associated with the sensor arrangement further comprising:

generating a graphic indicating the sensor arrangement; and initiating display of the graphic.

* * * * *

UNITED STATES PATENT AND TRADEMARK OFFICE

CERTIFICATE OF CORRECTION

PATENT NO. : 8,645,305 B2
APPLICATION NO. : 12/911948
DATED : February 4, 2014
INVENTOR(S) : Sandoval et al.

It is certified that error appears in the above-identified patent and that said Letters Patent is hereby corrected as shown below:

In the Specification

Column 2, line 17, delete “paths” and insert --paths 12--, therefor

Column 2, line 25, delete “Memory” and insert --Memory 38--, therefor

Column 2, line 41, delete “path 16.” and insert --path 12.--, therefor

Column 3, line 19, delete “engine” and insert --engine 42--, therefor

Column 5, line 35, delete “where” and insert --where n--, therefor

In the Claims

Column 11, line 26, in Claim 9, after “and”, insert --¶--, therefor

Column 12, line 15, in Claim 13, after “location;”, insert --and--, therefor

Column 12, line 22, in Claim 13, after “value;”, delete “and”, therefor

Signed and Sealed this
Eighteenth Day of November, 2014

Michelle K. Lee

Michelle K. Lee
*Deputy Director of the United States Patent and Trademark Office*